(12) United States Patent
Liu et al.

(10) Patent No.: US 12,226,741 B2
(45) Date of Patent: Feb. 18, 2025

(54) ZEOLITE FILM COMPOSITE BODY, METHOD FOR PRODUCING SAME, AND FLUID SEPARATION METHOD

(71) Applicant: RESEARCH INSTITUTE OF INNOVATIVE TECHNOLOGY FOR THE EARTH, Kyoto (JP)

(72) Inventors: Bo Liu, Kyoto (JP); Katsunori Yogo, Kyoto (JP)

(73) Assignee: RESEARCH INSTITUTE OF INNOVATIVE TECHNOLOGY FOR THE EARTH, Kyoto (JP)

( * ) Notice: Subject to any disclaimer, the term of this patent is extended or adjusted under 35 U.S.C. 154(b) by 482 days.

(21) Appl. No.: 17/621,780

(22) PCT Filed: May 14, 2020

(86) PCT No.: PCT/JP2020/019275
§ 371 (c)(1),
(2) Date: Dec. 22, 2021

(87) PCT Pub. No.: WO2020/261795
PCT Pub. Date: Dec. 30, 2020

(65) Prior Publication Data
US 2022/0241732 A1 Aug. 4, 2022

(30) Foreign Application Priority Data
Jun. 27, 2019 (JP) .................. 2019-119548

(51) Int. Cl.
*B01D 69/12* (2006.01)
*B01D 61/36* (2006.01)
(Continued)

(52) U.S. Cl.
CPC ......... *B01D 71/025* (2013.01); *B01D 61/363* (2022.08); *B01D 71/0215* (2022.08);
(Continued)

(58) Field of Classification Search
CPC .............. B01D 61/363; B01D 71/0215; B01D 71/025; B01D 71/027; B01D 63/062;
(Continued)

(56) References Cited

U.S. PATENT DOCUMENTS

| | | |
|---|---|---|
| 5,554,286 A | 9/1996 | Okamoto et al. |
| 2014/0050659 A1 | 2/2014 | Rimer et al. |

(Continued)

FOREIGN PATENT DOCUMENTS

| | | |
|---|---|---|
| JP | 2005-263596 A | 9/2005 |
| JP | 2012236155 A | 12/2012 |
| JP | 2018-038977 A | 3/2018 |

OTHER PUBLICATIONS

International Search Report and Written Opinion, PCT/JP2020/019275, dated Jul. 28, 2020, 10 pages.
(Continued)

*Primary Examiner* — Madeline Gonzalez
(74) *Attorney, Agent, or Firm* — Stinson LLP

(57) ABSTRACT

A zeolite membrane composite including a porous support and a zeolite membrane formed on a surface of the porous support. The zeolite membrane has an LTA-type crystal structure. The first atomic ratio: Si/Al of silicon element (Si) to aluminum element (Al) in the zeolite membrane is 1.29 or greater and 1.60 or less.

6 Claims, 8 Drawing Sheets

(51) Int. Cl.
  *B01D 71/02* (2006.01)
  *C01B 39/46* (2006.01)
  *C04B 41/85* (2006.01)
(52) U.S. Cl.
  CPC ............ *B01D 71/027* (2013.01); *C01B 39/46* (2013.01); *C04B 41/85* (2013.01)
(58) Field of Classification Search
  CPC .. B01D 67/0051; B01D 71/028; C01B 39/46; C04B 41/85
  USPC .......... 210/500.25, 500.21, 488–490, 510.1, 210/500.1; 264/45.1; 502/64, 235
  See application file for complete search history.

(56) References Cited

U.S. PATENT DOCUMENTS

| | | |
|---|---|---|
| 2016/0137517 A1 | 5/2016 | Nicolas et al. |
| 2017/0189862 A1 | 7/2017 | Imaska et al. |
| 2017/0225130 A1* | 8/2017 | Noda ................ B01D 71/0281 |

OTHER PUBLICATIONS

Conato et al., "Framework stabilization of Si-rich LTA zeolite prepared in organic-free media", Chemical Communications, 2015, vol. 51, pp. 269-272.

* cited by examiner

ZEOLITE FILM COMPOSITE BODY, METHOD FOR PRODUCING SAME, AND FLUID SEPARATION METHOD

REFERENCE TO RELATED APPLICATIONS

This application is the 371 U.S. national stage application of International Patent Application No. PCT/JP2020/019275, filed May 14, 2020, which claims the benefit of Japanese Patent Application No. 2019-119548, filed Jun. 27, 2019, the entire disclosures of which are incorporated herein by reference.

TECHNICAL FIELD

The present invention relates to a zeolite membrane composite including a zeolite membrane having an LTA-type crystal structure.

BACKGROUND ART

As a technique for separation and purification of a gas and/or a liquid (hereinafter collectively referred to as a fluid), various methods are known, such as adsorption, distillation, cryogenic distillation, and membrane separation methods. Among them, membrane separation methods are seen as promising in view of energy saving. According to membrane separation methods, molecules can be separated without being accompanied by changes in phase, and the apparatus used therefor can be made compact in size.

As a separation membrane used for membrane separation methods, an inorganic membrane is desirable in terms of its excellent heat resistance, pressure resistance, and durability, although there are other membranes under development, such as a polymer membrane and an organic-inorganic composite membrane.

A zeolite membrane being an inorganic membrane has fine uniform pores which allows permeation of molecules smaller than the pore diameter and inhibits permeation of molecules larger than the pore diameter, and therefore, it can be utilized as a molecular sieve membrane. A typical zeolite is known as crystalline aluminosilicate, which is a porous material containing silica (silicon dioxide) and alumina (aluminum oxide) as main components and containing an alkali metal cation for charge compensation.

Zeolites have various framework structures, and their properties are different depending on their structures. Therefore, a zeolite membrane exhibits different properties according to the structure of the zeolite constituting the membrane. For example, a zeolite membrane having an LTA-type crystal structure has excellent water permselectivity and is used for water separation.

Patent Literature 1 discloses a liquid mixture separation membrane comprising a zeolite membrane having an LTA-type crystal structure formed on a porous support, and discusses its water permselectivity from liquid mixtures, such as those of water and alcohols, water and ketones, and water and halogenated hydrocarbons.

Patent Literature 2 discloses a method for producing a dense and thin zeolite separation membrane by forming a layer of a precursor gel containing zeolite particles on a support, followed by heating in the presence of water vapor. Regarding a zeolite separation membrane obtained using LTA zeolite particles, the literature discusses its performance of separating water vapor from a mixed gas containing two or more kinds of gases including water vapor.

Zeolites are known to exhibit different properties, depending not only on the framework structure but also on the atomic ratio: Si/Al of silicon element (Si) to aluminum element (Al) in the aluminosilicate. For example, the smaller the Si/Al ratio is, the higher the hydrophilicity is. On the other hand, the greater the Si/Al ratio is, the higher the thermal stability and the acid resistance are, and furthermore, the higher the hydrothermal stability at high temperatures is.

When the value of the atomic ratio: Si/Al in the aluminosilicate is increased to a certain level, the LTA zeolite becomes unstable in structure. Therefore, it has been considered difficult to synthesize an LTA zeolite in which the Si/Al ratio is large. Non-Patent Literature 1 reports a successful synthesis of an LTA zeolite in which the atomic ratio: Si/Al is 1.7 to 2.1.

CITATION LIST

Patent Literature

[PTL 1] Japanese Laid-Open Patent Publication No. H7-185275
[PTL 2] Japanese Laid-Open Patent Publication No. 2018-38977

Non-Patent Literature

[NPLT 1] Marlon T. Conato et al., Chem. Commun., 2015, 51, 269-272

SUMMARY OF INVENTION

Technical Problem

The atomic ratio: Si/Al of silicon element (Si) to aluminum element (Al) contained in a zeolite membrane having an LTA-type crystal structure is usually approximately 1. Such a membrane is insufficient to serve as a separation membrane, in terms of the thermal stability and hydrothermal stability. In order to obtain a separation membrane having excellent performance, it is desirable to increase the Si/Al ratio. This, however, results in an unstable structure of the LTA zeolite, which has been an obstacle to obtain a desired zeolite membrane having a Si/Al ratio of greater than one.

Although the synthesis of an LTA zeolite (powder) having a Si/Al ratio of 1.7 to 2.1 is reported in Non-Patent Literature 1, no report has been made yet of an example of successful production of a zeolite membrane with an LTA-type crystal structure having such a high Si/Al ratio.

Solution to Problem

One aspect of the present invention relates to a zeolite membrane composite, including: a porous support; and a zeolite membrane formed on a surface of the porous support, wherein the zeolite membrane has an LTA-type crystal structure, and the zeolite membrane has a first atomic ratio: Si/Al of silicon element (Si) to aluminum element (Al) of 1.29 or greater and 1.60 or less.

Another aspect of the present invention relates to a method for producing a zeolite membrane composite, the method including steps of: (i) preparing a porous support having a first surface and a second surface and having pores allowing the first surface and the second surface to communicate with each other; (ii) applying a seed crystal having an LTA-type crystal structure to at least one selected from the first surface and the second surface; (iii) preparing a gel solution containing silicon (Si), aluminum (Al), hydroxide ions (OH⁻) and water ($H_2O$); and (iv) bringing the surface of the porous support applied with the seed crystal into contact with the gel solution, to allow a zeolite membrane having an LTA-type crystal structure to grow on the surface by hydrothermal synthesis, wherein provided that the Si and the Al contained in the gel solution all form silicon dioxide ($SiO_2$) and aluminum oxide ($Al_2O_3$), the gel solution has a molar ratio: $SiO_2/Al_2O_3$ of the $SiO_2$ to the $Al_2O_3$ of 3 or greater and 9 or less, a molar ratio: $H_2O/SiO_2$ of the $H_2O$ to the $SiO_2$ of greater than 10 and 100 or less, and a molar ratio: $SiO_2/OH^-$ of the $SiO_2$ to the $OH^-$ of 1.3 or greater and less than 2.5.

Yet another aspect of the present invention relates to a fluid separation method for separating a specific component from a mixed fluid using the above-described zeolite membrane composite, the method including steps of: (i) supplying a fluid containing a first component and a second component differing in permeance through the zeolite membrane, into a first space communicating with the pores at one of the first surface and the second surface, and (ii) collecting a permeated fluid having permeated through the zeolite membrane, from a second space communicating with the pores at the other of the first surface and the second surface, and collecting a non-permeated fluid from the first space.

Advantageous Effects of Invention

According to the present invention, a zeolite membrane having an LTA-type crystal structure in which the atomic ratio: Si/Al of silicon element (Si) to aluminum element (Al) is greater than one can be provided.

DESCRIPTION OF EMBODIMENTS

Figure 1:
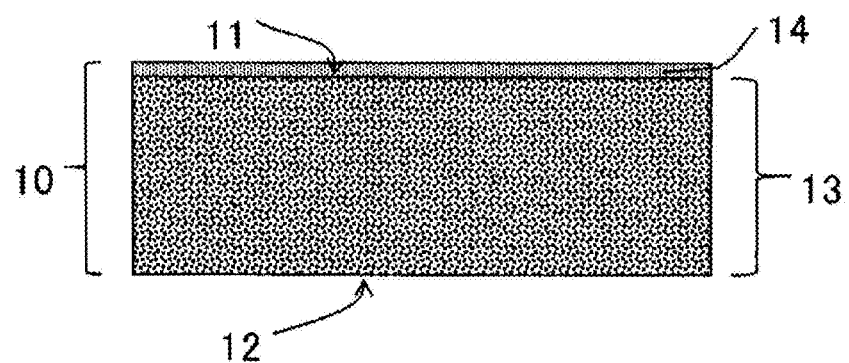
FIG. 1 An enlarged cross-sectional view conceptually showing an example of a structure of a zeolite membrane composite.

A zeolite membrane composite according to the present invention includes a porous support and a zeolite membrane formed on a surface of the porous support. Here, the zeolite membrane has an LTA-type crystal structure, and a first atomic ratio: Si/Al of silicon element (Si) to aluminum element (Al) contained in the zeolite membrane is 1.29 or greater and 1.60 or less. At this time, the zeolite membrane has a stable LTA-type crystal structure and can exhibit excellent thermal stability, acid resistance and hydrothermal stability. That is, a zeolite membrane having an LTA-type crystal structure having a first atomic ratio within the above range not only exhibits high water selectivity and water permeability but also is excellent in thermal stability, acid resistance and hydrothermal stability. This enables its application to various fluid separation methods. The first atomic ratio: Si/Al is preferably 1.45 or greater, more preferably 1.49 or greater and 1.54 or less.

The first atomic ratio: Si/Al can be measured by, for example, a scanning electron microscopy (SEM) coupled with energy-dispersive X-ray spectroscopy (EDX). The first atomic ratio: Si/Al can be determined from the composition of silicon element (Si) and aluminum element (Al) which is analyzed using SEM images of the surface and the cross section of the membrane.

The LTA representing the zeolite structure is a code specifying the zeolite structure approved by the International Zeolite Association (IZA).

The thickness of the zeolite membrane is not limited, but is preferably 20 μm or less, more preferably 10 μm or less, in view of achieving high permeance. In view of forming a membrane with less defects and realizing high selectivity, the thickness of the zeolite membrane is more preferably 2 μm or more. The zeolite membrane formed on a surface of a porous support usually has a composite layer formed of the porous support and silica or alumina or zeolite. The preferred range of the thickness of the zeolite membrane is determined excluding such a composite layer. The thickness of the membrane is measured, for example, from the analysis data of a scanning electron micrograph.

The porous support may be of any shape, but usually has a first surface and a second surface and has pores allowing the first surface and the second surface to communicate with each other. A zeolite membrane having an LTA-type crystal structure is formed on at least one of the first and second surfaces.

The material of the porous support is, in view of durability, desirably an inorganic material, and preferably ceramics or a sintered porous metal having air permeability. As the ceramics, a metal oxide, such as silica, alumina, mullite, zirconia, cordierite, and titania can be used. Furthermore, a metal, such as stainless steel, copper, aluminum and titanium, a nitride, such as silicon nitride, and a carbide, such as silicon carbide can also be used. Preferred among them is at least one selected from the group consisting of mullite, silica, alumina, and stainless steel, in view of the ease of shaping and their inexpensive availability. These may be used singly or in combination of two or more kinds.

The average pore diameter of the porous support is not limited, but is, for example, 0.1 μm or more, and may be, for example, 10 μm or less, in terms of the durability and the gas permeability. The average pore diameter of the porous support can be measured by, for example, a mercury intrusion porosimetry.

The porosity of the porous support is not limited, but is, for example, 30% or more, and may be 60% or less, in terms of the durability and gas permeability. The porosity of the porous support can be determined by, for example, a mercury intrusion porosimetry or a density measurement.

Figure 2:
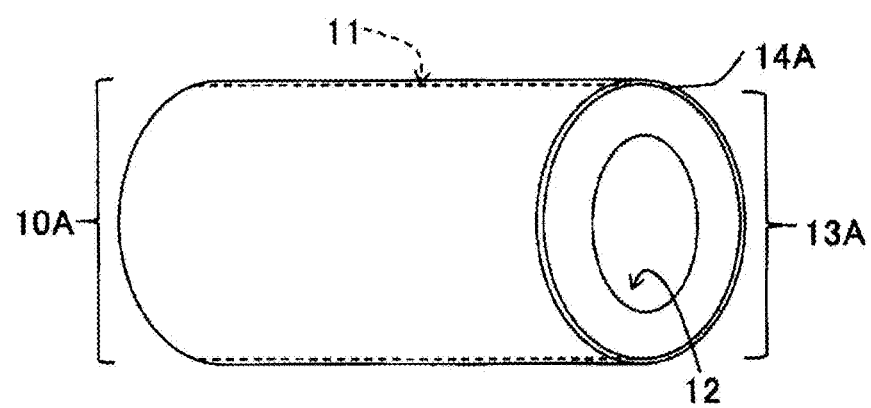
FIG. 2 An oblique view conceptually showing an example of a zeolite membrane composite of a cylindrical shape.

FIG. 1 is an enlarged cross-sectional view conceptually showing a zeolite membrane composite 10 including a porous support 13 having a first surface 11 and a second surface 12, and a zeolite membrane 14 formed on the first surface 11. FIG. 2 is an oblique view conceptually showing a zeolite membrane composite 10A including a cylindrical porous support 13A and a zeolite membrane 14A formed on the outer peripheral surface thereof.

The zeolite membrane composite can be used for a fluid separation method of separating a specific component from a mixed fluid. For example, when a mixed fluid containing a first component and a second component differing in permeance through the zeolite membrane (molecular permeation rate) is supplied to a first space communicating with the pores of the porous support at one of the first and second surfaces, one of the first and second components preferentially passes through the zeolite membrane and the pores of the porous support. As a result, a permeated fluid having a different composition from that of the mixed fluid supplied to the first space moves toward and into a second space communicating with the pores of the porous support at the other of the first and second surfaces. By collecting the permeated fluid, and repeating as necessary an operation similar to the above, the first component or the second component can be separated.

The first and second components are not limited, but the first component is exemplified by water, and the second component is exemplified by: alcohols, such as methanol, ethanol, isopropyl alcohol, isobutanol, and allyl alcohol; ketones, such as acetone and methyl isobutyl ketone; and ethers, such as dioxane, tetrahydrofuran, and dimethyl ether. When the second component is at least one selected from the group consisting of methanol, ethanol, and isopropyl alcohol, the zeolite membrane composite according to the present invention can exhibit particularly excellent separation capability.

The zeolite membrane composite is also applicable to various dehydration processes, such as separation of water from a mixed fluid containing acetic acid (second component) and water (first component) in an acetic acid production process, separation of water from a mixed fluid containing ethanol (second component) and water (first component) in a bioethanol production process, separation of water from a mixed fluid containing isopropyl alcohol (second component) and water (first component) used for semiconductor cleaning, and separation of water from a mixed fluid containing isobutanol (second component) and water (first component) in a bio-isobutanol production process.

Other examples of the applicable use include a membrane reactor with a membrane incorporated therein. One specific example thereof is a membrane reactor for synthesizing methanol from carbon dioxide. The reaction of synthesizing methanol from carbon dioxide can be represented by the following formula (1):

$$CO_2 + 3H_2 \rightarrow CH_3OH + H_2O \quad (1)$$

By using a membrane having excellent water permselectivity in the membrane reactor, water can be selectively and efficiently removed from the reaction system. Thus, the equilibrium of the reaction shifts toward the right, and the conversion of carbon dioxide and hydrogen can be improved.

When placed, for example, in an aqueous methanol solution at 60° C. having a methanol concentration of 50 mass %, with a supply side pressure set at 0.1 MPa and a permeation side pressure set at 1 kPa, the zeolite membrane composite can exhibit a total permeation flux of 0.5 kg/m²·h or more and 1.0 kg/m²·h or less. At this time, the permeance of water can be, for example, $1 \times 10^{-7}$ mol/m²·s·Pa or more and $5 \times 10^{-7}$ mol/m²·s·Pa or less. The permeance of methanol can be $1 \times 10^{-10}$ mol/m²·s·Pa or more and $5 \times 10^{-10}$ mol/m²·s·Pa or less. The water selectivity, which is the ratio of the permeance of water to the permeance of methanol, can reach 600 or higher.

Next, a description will be given below of a method for producing a zeolite membrane composite according to the present invention.

The production method includes steps of: (i) preparing a porous support having a first surface and a second surface and having pores allowing the first surface and the second surface to communicate with each other; (ii) applying a seed crystal having an LTA-type crystal structure to at least one selected from the first surface and the second surface; (iii) preparing a gel solution containing silicon (Si), aluminum (Al), hydroxide ions (OH⁻) and water (H₂O); and (iv) bringing the surface applied with the seed crystal of the porous support into contact with the gel solution, and allowing a zeolite membrane having an LTA-type crystal structure to grow on the surface by hydrothermal synthesis.

To form a zeolite membrane having an LTA-type crystal structure on a porous support, it is necessary to allow crystals to grow preferentially on a surface of the porous support rather than on the liquid phase side. For that, the step (ii) is important, in which a seed crystal prepared beforehand is attached to the surface of the porous support, prior to the hydrothermal synthesis of step (iv). The seed crystal is applied to at least one of the first surface and the second surface.

The gel solution used in in the step (iv) to be brought into contact with the surface applied with the seed crystal of the porous support includes a predetermined amount of silicon (Si), aluminum (Al), hydroxide ions (OH⁺), and water (H₂O). By using the gel solution as above, the zeolite membrane obtained after hydrothermal synthesis can have a first atomic ratio: Si/Al of silicon element (Si) to aluminum element (Al) of greater than one. That is, a zeolite membrane having excellent thermal stability, acid resistance, and hydrothermal stability can be obtained.

In the following, the steps (ii) to (iv) will be specifically described.

(Seed Crystal)

As the seed crystal, a zeolite powder having an LTA-type crystal structure can be used without limitation.

However, in order to obtain a zeolite membrane having excellent thermal stability, acid resistance, and hydrothermal stability in the step (iv), the seed crystal preferably has a second atomic ratio: Si/Al of silicon element (Si) to aluminum element (Al) of 1.0 or greater and 2.2 or less, more preferably of 2.0 or greater and 2.2 or less.

(Synthesis of Seed Crystal)

The method for producing a zeolite powder having an LTA-type crystal structure to be used as a seed crystal is not limited, and any known method can be adopted. For example, the zeolite powder can be synthesized from a gel solution containing a silicon element (Si) source, an aluminum element (Al) source, and a sodium element (Na) source, as raw materials. Here, Na acts as a structure-directing agent for a zeolite having an LTA-type crystal structure.

Examples of the silicon element (Si) source include colloidal silica, sodium silicate, fumed silica, and silicon compounds having a hydrolyzable group (e.g., an alkoxy group). Examples of the aluminum element (Al) source include aluminum hydroxide, sodium aluminate, aluminum nitrate, aluminum compounds having a hydrolyzable group (e.g., an alkoxy groups), and aluminum powder. Examples of the sodium element (Na) source that acts as a structure-directing agent include sodium hydroxide and sodium aluminate.

The zeolite powder having a second atomic ratio: Si/Al of 1.0 or greater and 2.2 or less can be synthesized, for example, by the following method.

First, sodium hydroxide (NaOH) and sodium aluminate (NaAlO$_2$) are added to water (H$_2$O) and stirred at room temperature. The sodium aluminate may have a molar ratio of aluminum (Al) to sodium hydroxide (NaOH) of, for example, 0.6 to 1.0 (preferably of 0.8).

To the resulting solution, colloidal silica (SiO$_2$) is added and stirred at room temperature for 6 hours to 24 hours, to prepare a semi-transparent gel solution. At this time, the gel solution contains silicon (Si), aluminum (Al), hydroxide ions (OH), and water (H$_2$O).

Provided that the Si and the Al in the gel solution all form silicon dioxide (SiO$_2$) and aluminum oxide (Al$_2$O$_3$), the molar ratio: SiO$_2$/Al$_2$O$_3$ of the SiO$_2$ to the Al$_2$O$_3$ is preferably 3 or greater and 10 or less, more preferably 3 or greater and 5 or less. In this case, sufficient amounts of silicon element (Si) and aluminum element (Al) can be supplied for forming an LTA zeolite, and a highly crystalline LTA zeolite can be obtained.

The molar ratio: H$_2$O/SiO$_2$ of the H$_2$O to the SiO$_2$ in the gel solution is preferably 5 or greater, more preferably 8 or greater, for allowing the zeolite to grow efficiently and with high yield. To prevent the slowing of zeolite growth due to too much decrease in Si concentration in the gel solution, the ratio is preferably 20 or less, more preferably 10 or less.

The molar ratio: SiO$_2$/OH$^-$ of the SiO$_2$ to the OH$^-$ in the gel solution is preferably 1.3 or greater and 2.5 or less, more preferably 1.3 or greater and 2.0 or less. In this case, the gel solution exhibits weak alkalinity. A zeolite obtained from such a gel solution tends to have an LTA-type crystal structure, and the second atomic ratio: Si/Al tends to be 1.0 or greater and 2.2 or less.

The molar ratio: SiO$_2$/Al$_2$O$_3$, the molar ratio: H$_2$O/SiO$_2$, and the molar ratio: SiO$_2$/OH$^-$ can be determined from, for example, a composition ratio calculated from the mass of each of the raw materials contained in the gel solution.

Subsequently, the prepared gel solution is subjected to hydrothermal synthesis of heating at 60° C. to 110° C. for 12 hours to 148 hours, thereby to obtain a crystal product. After the hydrothermal synthesis, the crystal product is filtered, and washed with water until reaching neutral, and then dried at 60° C. to 80° C. A zeolite powder having an LTA-type crystal structure to serve as a seed crystal can be thus obtained.

Hydrothermal synthesis is a generic term for the synthesis of substances via synthetic reactions performed typically under high temperatures and high pressures in the presence of water, and is suitable as a method for producing a zeolite. Hydrothermal synthesis is usually carried out within an autoclave under the water vapor pressure generated by heating. The autoclave may be, for example, an airtight container made of fluororesin covered by a stainless steel cover. The pressure is usually 0.1 MPa to 3 MPa, preferably 0.4 MPa to 2 MPa.

The second atomic ratio: Si/Al of the zeolite powder having an LTA-type crystal structure is measured by, for example, dissolving the powder with acid, and subjecting the dissolved matter to inductively coupled plasma optical emission spectrometry (ICP-OES).

The zeolite powder may be pulverized to have an average particle diameter of approximately 100 nm to 200 nm, before it is used as a seed crystal.

The average particle diameter refers to a median diameter in a volume-based particle size distribution, and can be measured using, for example, a laser diffraction particle size distribution analyzer.

(Application of Seed Crystal)

The method of applying the seed crystal to the porous support is not limited. For example, a slurry coating method can be used for the application.

(Preparation of Membrane-Forming Gel Solution)

In the step (iv), by bringing the surface applied with the seed crystal of the porous support into contact with the gel solution, a zeolite membrane is formed. The gel solution contains a silicon element (Si) source and an aluminum element (Al) source as raw materials. The gel solution further contains a sodium element (Na) source that acts as a structure-directing agent in a zeolite having an LTA type crystal structure.

As the silicon element (Si), aluminum element (Al), and sodium element (Na) sources, compounds similar to those used for the seed crystal synthesis can be used. The amount of Na used may also be similar to that in the seed crystal synthesis.

The prepared gel solution contains silicon (Si), aluminum (Al), hydroxide ions (OH$^-$), and water (H$_2$O). Provided that the Si and the Al in the gel solution all form silicon dioxide (SiO$_2$) and aluminum oxide (Al$_2$O$_3$), the molar ratio: SiO$_2$/A$_2$O$_3$ of the SiO$_2$ to the Al$_2$O$_3$ in the gel solution is 3 or greater and 9 or less, preferably 4 or greater and 7 or less, more preferably 4 or greater and 5 or less. In this case, sufficient amounts of silicon element (Si) and aluminum element (Al) can be supplied for forming an LTA zeolite, and a membrane of a highly crystalline LTA zeolite can be obtained.

The molar ratio: H$_2$O/SiO$_2$ of the H$_2$O to the SiO$_2$ in the gel solution is greater than 10 and 100 or less, preferably 20 or greater and 60 or less, more preferably 30 or greater and 40 or less. In this case, a zeolite membrane can grow efficiently and with high yield. Furthermore, the Si concentration is unlikely to decrease too much, and thus, the membrane growth can also be facilitated.

The molar ratio: SiO$_2$/OH$^-$ of the SiO$_2$ to the OH$^-$ in the gel solution is 1.3 or greater and less than 2.5, preferably 1.3 or greater and 2.0 or less, more preferably 1.5 or greater and 2.0 or less. In this case, the gel solution exhibits weak alkalinity. A zeolite membrane obtained from such a gel solution tends to have a stable LTA-type crystal structure, and the first atomic ratio: Si/Al tends to be high.

The molar ratio: SiO$_2$/Al$_2$O$_3$, the molar ratio: H$_2$O/SiO$_2$, and the molar ratio: SiO$_2$/OH$^-$ can be determined from, for example, a composition ratio calculated from the mass of each of the raw materials contained in the gel solution.

(Formation of Zeolite Membrane Having LTA-type Crystal Structure)

The porous support applied with the seed crystal powder is immersed in the membrane-forming gel solution, and subjected to hydrothermal synthesis, and thus, a zeolite membrane having an LTA-type crystal structure can be formed on a surface of the porous support. The hydrothermal synthesis may be performed under any conditions, and may be performed, for example, at 80° C. or higher and 160° C. or lower, or at 100° C. or higher and 130° C. or lower. The duration of hydrothermal synthesis is, for example, 1 hour or more and 96 hours or less, and may be 24 hours or more and 72 hours or less.

A membrane product of the hydrothermal synthesis is washed with water until reaching neutral, and then dried, for example, at 60° C. to 80° C. for 6 hours to 24 hours. A zeolite membrane composite including the zeolite membrane having an LTA-type crystal structure can be thus obtained.

EXAMPLES

A detailed description will be given below of a zeolite membrane composite according to the present disclosure by way of Examples. It is to be noted, however, the present invention is not limited to these Examples.

Example 1

[Production of Zeolite Membrane Composite]
Step (i)
(Preparation of Porous Support)

As a porous support used here having a first surface and a second surface and having pores allowing the first surface and the second surface to communicate with each other, an alumina tube (available from Nikkato Corporation, hereinafter, an alumina support) having an average pore diameter of 1.3 μm, an outer diameter of 12 mm, an inner diameter of 10 mm, a porosity of approximately 30%, and a length of 30 mm was used. The alumina support was boiled and washed with ultrapure water and then dried, before use. The outer peripheral surface of the alumina support corresponds to the first surface, and the inner peripheral surface thereof corresponds to the second surface.

Step (ii)

A zeolite powder (seed crystal) having an LTA-type crystal structure synthesized in the following manner was applied to the outer peripheral surface (first surface) of the alumina support by a slurry coating method, and dried at 80° C. for 2 hours.

(Synthesis of Seed Crystal)

Here, a zeolite having an LTA-type crystal structure to serve as a seed crystal was synthesized in accordance with the method as disclosed in Non-Patent Literature 1 (Marlon T. Conato et al., Chem. Commun., 2015, 51, 269-272).

To 30.4 g of distilled water in a glass beaker, 0.21 g of sodium hydroxide (97 mass %, 1st grade, available from Wako Pure Chemical Industries, Ltd.) and sodium aluminate powder (molar ratio of Al to NaOH:Al/NaOH=0.80, available from Wako Pure Chemical Industries, Ltd.) were added, and stirred at room temperature for 20 minutes. To the resulting solution, 55.08 g of colloidal silica ($SiO_2$, LUDOX AS-40, 40 mass % suspension in $H_2O$, available from Sigma-Aldrich Co. LLC.) was added while stirred at room temperature for 24 hours, until a uniform gel solution was formed. The prepared gel solution contained silicon (Si), aluminum (Al), hydroxide ions ($OH^-$) and water ($H_2O$). Provided that the Si and the Al in the gel solution all formed silicon dioxide ($SiO_2$) and aluminum oxide ($Al_2O_3$), the molar ratio: $SiO_2/Al_2O_3$ of the $SiO_2$ to the $Al_2O_3$ in the gel solution was 4.6, the molar ratio: $H_2O/SiO_2$ of the $H_2O$ to the $SiO_2$ was 9.6, and the molar ratio: $SiO_2/OH^-$ of the $SiO_2$ to the $OH^-$ was 1.8.

The gel solution was placed in a stainless steel pressure-resistant vessel with a fluororesin inner cylinder, and heated at 100° C. for 24 hours, to perform hydrothermal synthesis. The product was then filtered, and washed with distilled water until reaching neutral, followed by drying overnight at 80° C.

The average particle diameter of the obtained powder was approximately 0.5 μm. The powder was used as it is as a seed crystal.

Step (iii)
(Preparation of Membrane-Forming Gel Solution)

To 40.00 g of distilled water in a glass beaker, 29.50 g of sodium aluminate powder (molar ratio of Al and NaOH:Al/NaOH=0.80, available from Wako Pure Chemical Industries, Ltd.) was added. This was followed by stirring at room temperature for 20 minutes, to give a sodium aluminate solution.

To 416.34 g of distilled water in a fluororesin container, 113.74 g of colloidal silica ($SiO_2$, LUDOX AS-40, 40 mass % suspension in $H_2O$, available from Sigma-Aldrich Co. LLC.) was added. The above-mentioned sodium aluminate solution was slowly added thereto, under stirring with a paddle mixer. This was followed by aging until a uniform gel was formed, under stirring at room temperature for 6 hours, so as not to have unevenness. The prepared gel solution contained silicon (Si), aluminum (Al), hydroxide ions ($OH^-$) and water ($H_2O$). Provided that the Si and the Al in the gel solution all formed silicon dioxide ($SiO_2$) and aluminum oxide ($Al_2O_3$), the molar ratio: $SiO_2/Al_2O_3$ of the $SiO_2$ to the $Al_2O_3$ in the gel solution was 4.6, the molar ratio: $H_2O/SiO_2$ of the $H_2O$ to the $SiO_2$ was 38, and the molar ratio: $SiO_2/OH^-$ of the $SiO_2$ to the $OH^-$ was 1.8.

Step (iv)
(Formation of Zeolite Membrane)

To the gel solution obtained in the step (iii), the alumina support with the seed crystal applied on the first surface obtained in the step (ii) was immersed, and heated at 120° C. for 48 hours to perform hydrothermal synthesis, to allow a zeolite membrane to grow on the first surface. Thereafter, a membrane product including the zeolite membrane was taken out from the gel solution, and washed with pure water until reaching neutral. This was followed by drying overnight at 80° C., to give a zeolite membrane composite M1. In the manner similar to the above, zeolite membrane composites M2 and M3 were produced.

[Evaluation of Structures of Seed Crystal and Zeolite Membrane Composite]

The structures of the synthesized seed crystals and the produced zeolite membrane composites were evaluated, using a scanning electron microscope (SU9000, available from Hitachi High-Tech Corporation), an X-ray diffractometer (RINT 2000, available from Rigaku Corporation), and an inductively coupled plasma optical emission spectrometer (Agilent 5110, available from Agilent Technologies, Inc.).

(Scanning Electron Microscope Observation)

Figure 3:
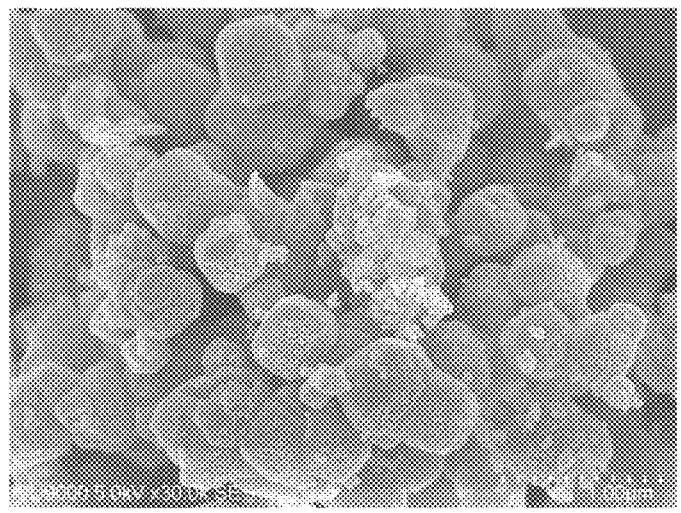
FIG. 3 A scanning electron micrograph (SEM image) of a seed crystal synthesized in Example 1.
Figure 4:
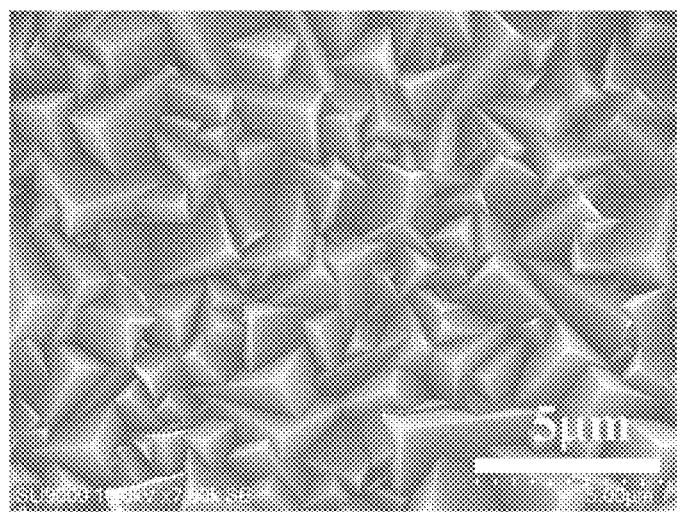
FIG. 4 An SEM image of a surface of a membrane formed in Example 1.
Figure 5:
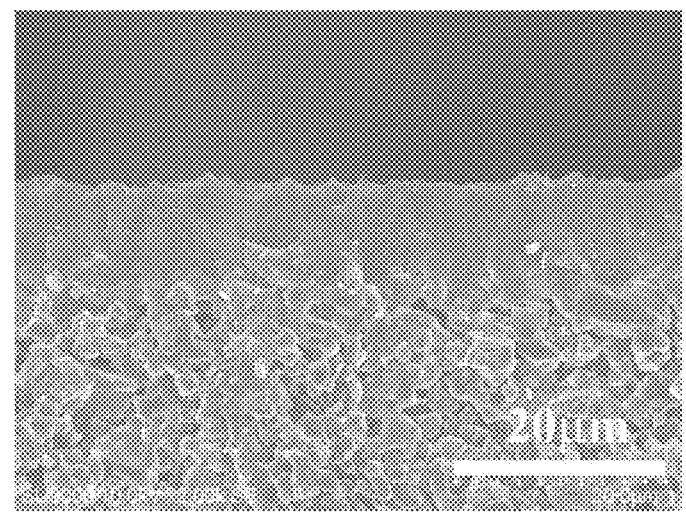
FIG. 5 An SEM image of a cross section of the membrane formed in Example 1.

The zeolite powder serving as a seed crystal and the zeolite membrane surface of the zeolite membrane composite M1 were observed with a scanning electron microscope (SEM). With respect to the zeolite membrane, a crushed cross section thereof was also observed. FIG. 3 is an SEM image of the seed crystal, and FIG. 4 is an SEM image of the surface of the zeolite membrane. FIG. 5 is an SEM image of a crushed cross section of the zeolite membrane.

FIGS. 4 and 5 show that the zeolite membrane in M1 has a dense membrane structure. Within the observation field, neither pinhole nor crack was observed in the membrane. The film thickness was 7 μm.

(X-Ray Diffractometry)

Figure 6:
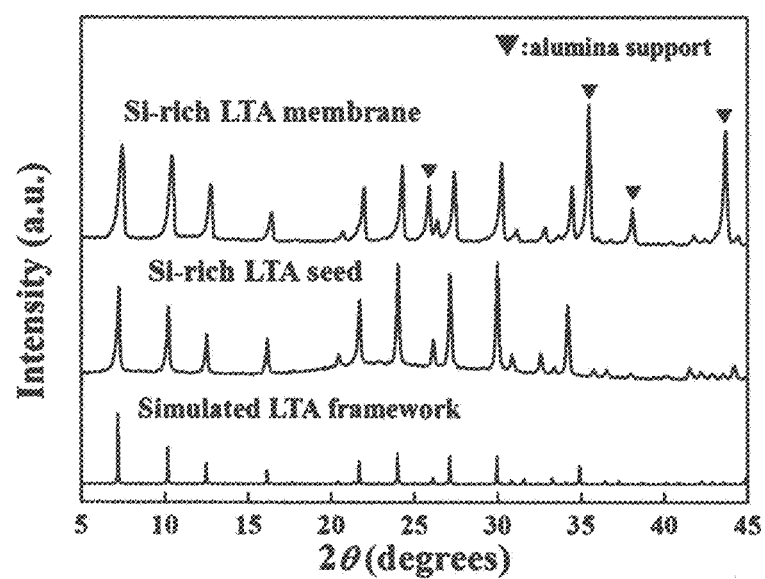
FIG. 6 X-ray diffraction patterns of the seed crystal synthesized and the membrane formed in Example 1.

The zeolite powder serving as a seed crystal and the zeolite membrane composite M1 were subjected to X-ray diffractometry, to analyze their diffraction patterns. FIG. 6 shows X-ray diffraction patterns of the seed crystal (Si-rich LTA seed) and the membrane formed (Si-rich LTA membrane). The diffraction patterns of the zeolite powder serving as a seed crystal and the membrane in the zeolite membrane composite M1 agreed with the LTA topology (Simulated LTA framework).

(Scanning Electron Microscopy Coupled With Energy-Dispersive X-ray Spectroscopy)

The composition of silicon element (Si) and aluminum element (Al) was measured from the SEM images of the surface and the cross section of the membrane by a scanning electron microscopy (SEM) coupled with energy dispersive X-ray spectroscopy (EDX). The first atomic ratios: Si/Al of the membranes in the zeolite membrane composites M1, M2 and M3 were 1.54 in M1, 1.52 in M2, and 1.49 in M3.

(Inductively Coupled Plasma Optical Emission Spectrometry)

The second atomic ratio: Si/Al of the zeolite powder serving as a seed crystal was determined by an inductively coupled plasma optical emission spectrometry (ICP-OES).

Samples used for analysis were prepared as follows. First, 0.1 g of zeolite powder serving as a seed crystal was completely dissolved in an acid solution containing 1.3 g of hydrofluoric acid (46 to 48 mass %, available from Wako Pure Chemical Industries, Ltd.) and 10.0 ml of ultrapure water, and stirred at room temperature for 5 minutes. Next, 2.7 g of hydrochloric acid (35 to 37 mass %, available from Wako Pure Chemical Industries, Ltd.) was added dropwise, to cause excess of hydrogen fluoride to react. The resulting transparent solution was placed in a 100-ml standard polypropylene (PP) container, to which ultrapure water was added, to prepare 100 ml of dilute solution. An analysis using this dilute solution as a sample found that the second atomic ratio: Si/Al in the zeolite powder serving as a seed crystal was 2.0.

Example 2

A zeolite membrane composite M4 was prepared in the same manner as in Example 1, except that the duration of hydrothermal synthesis in the step (iv) was set to 36 hours.

Example 3

A zeolite membrane composite M5 was prepared in the same manner as in Example 1, except that the molar ratio: $SiO_2/OH^-$ in the gel solution prepared in the step (iii) was set to 1.5.

Example 4

A zeolite membrane composite M6 was prepared in the same manner as in Example 1, except that the molar ratio: $H_2O/SiO_2$ in the gel solution prepared in the step (iii) was set to 100.

Example 5

A zeolite membrane composite M7 was prepared in the same manner as in Example 1, except that the molar ratio: $H_2O/SiO_2$ in the gel solution prepared in the step (iii) was set to 20.

Comparative Example 1

A zeolite membrane composite was prepared in the same manner as in Example 1, except that the molar ratio: $SiO_2/OH^-$ in the gel solution prepared in the step (iii) was set to 1.0, to increase the alkalinity of the gel solution.

Comparative Example 2

A zeolite membrane composite was prepared in the same manner as in Example 1, except that the molar ratio: $SiO_2/OH^-$ in the gel solution prepared in the step (iii) was set to 1.25, to increase the alkalinity of the gel solution.

Comparative Example 3

A zeolite membrane composite was prepared in the same manner as in Example 1, except that the molar ratio: $SiO_2/OH^-$ in the gel solution prepared in the step (iii) was set to 2.5, to decrease the alkalinity of the gel solution.

Comparative Example 4

A zeolite membrane composite was prepared in the same manner as in Example 1, except that the molar ratio: $SiO_2/OH^-$ in the gel solution prepared in the step (iii) was set to 3.0, to decrease the alkalinity of the gel solution.

Comparative Example 5

A zeolite membrane composite was prepared in the same manner as in Example 1, except that the molar ratio: $SiO_2/Al_2O_3$ in the gel solution prepared in the step (iii) was set to 2.0.

Comparative Example 6

A zeolite membrane composite was prepared in the same manner as in Example 1, except that the molar ratio: $SiO_2/Al_2O_3$ in the gel solution prepared in the step (iii) was set to 10.

Comparative Example 7

A zeolite membrane composite was prepared in the same manner as in Example 1, except that the molar ratio: $SiO_2/Al_2O_3$ in the gel solution prepared in the step (iii) was set to 15.

Comparative Example 8

A zeolite membrane composite was prepared in the same manner as in Example 1, except that the molar ratio: $H_2O/SiO_2$ in the gel solution prepared in the step (iii) was set to 10.

Comparative Example 9

A zeolite membrane composite was prepared in the same manner as in Example 1, except that the molar ratio: $H_2O/SiO_2$ in the gel solution prepared in the step (iii) was set to 10, and the hydrothermal synthesis was performed at 100° C. for 168 hours.

The zeolite membrane composites produced in Examples 2 to 5 and Comparative Examples 1 to 9 were also evaluated for their structures in the same manner as in Example 1. The results are shown in Table 1.

TABLE 1

| | Membrane growth conditions | | | | | Evaluation results | | |
|---|---|---|---|---|---|---|---|---|
| | Gel solution | | | Reaction temperature (°C.) | Reaction duration (h) | Type of membrane | First atomic ratio (Si/Al) | Number of membrane |
| | $SiO_2/Al_2O_3$ (Molar ratio) | $SiO_2/OH^-$ (Molar ratio) | $H_2O/SiO_2$ (Molar ratio) | | | | | |
| Ex. 1 | 4.6 | 1.8 | 38 | 120 | 48 | LTA | 1.54 | M1 |
| | 4.6 | 1.8 | 38 | 120 | 48 | LTA | 1.52 | M2 |
| | 4.6 | 1.8 | 38 | 120 | 48 | LTA | 1.49 | M3 |
| Ex. 2 | 4.6 | 1.8 | 38 | 120 | 36 | LTA | 1.45 | M4 |
| Ex. 3 | 4.6 | 1.5 | 38 | 120 | 48 | LTA | 1.29 | M5 |
| Ex. 4 | 4.6 | 1.8 | 100 | 120 | 48 | LTA | 1.39 | M6 |
| Ex. 5 | 4.6 | 1.8 | 20 | 120 | 48 | LTA | 1.60 | M7 |
| Com. Ex. 1 | 4.6 | 1.0 | 38 | 120 | 48 | GIS + CHA | 2.22 | |
| Com. Ex. 2 | 4.6 | 1.25 | 38 | 120 | 48 | GIS + CHA | 2.51 | |
| Com. Ex. 3 | 4.6 | 2.5 | 38 | 120 | 48 | LTA | 1.70 | |
| Com. Ex. 4 | 4.6 | 3.0 | 38 | 120 | 48 | Amorphous | | |
| Com. Ex. 5 | 2.0 | 1.8 | 38 | 120 | 48 | LTA | 1.02 | |
| Com. Ex. 6 | 10 | 1.8 | 38 | 120 | 48 | LTA | 1.63 | |
| Com. Ex. 7 | 15 | 1.8 | 38 | 120 | 48 | Amorphous + LTA | | |
| Com. Ex. 8 | 4.6 | 1.8 | 10 | 120 | 48 | LTA | 1.61 | |
| Com. Ex. 9 | 4.6 | 1.8 | 10 | 100 | 168 | LTA | 1.63 | |

The membranes in the zeolite membrane composite M1 to M7 obtained in Examples 1 to 5 in which the gel solution prepared in the step (iii) had a molar ratio: $SiO_2/Al_2O_3$ of 3 or greater and 9 or less, a molar ratio: $H_2O/SiO_2$ of greater than 10 and 100 or less, and a molar ratio: $SiO_2/OH^-$ of 1.3 or greater and less than 2.5 had an LTA-type crystal structure, and a first atomic ratio: Si/Al of 1.29 to 1.60.

In Comparative Examples 1 and 2 in which the alkalinity of the gel solution was high, a membrane having an LTA-type crystal structure was not obtained. The membrane obtained in Comparative Example 3 in which the alkalinity of the gel solution was low had an LTA-type crystal structure, but was fragile, with the first atomic ratio: Si/Al being as high as 1.70. In Comparative Example 4 in which the alkalinity of the gel solution was low, a membrane was not formed, and it remained amorphous.

In Comparative Example 5 in which the value of the molar ratio: $SiO_2/Al_2O_3$ was as small as less than 3, and in Comparative Example 6 in which the value was greater than 9, a membrane having an LTA-type crystal structure was formed, but the first atomic ratio: Si/Al failed to be 1.29 to 1.60. The membrane of Comparative Example 7 in which the value of $SiO_2/Al_2O_3$ was further greater than that in Comparative Example 6 had a portion having an LTA-type crystal structure and an amorphous portion.

In Comparative Examples 8 and 9 in which the values of the molar ratio: $H_2O/SiO_2$ were as small as 10 or less, a membrane having an LTA-type crystal structure was formed, which, however, was fragile, and the first atomic ratio: Si/Al failed to be 1.29 to 1.60.

[Evaluation of Dehydration Performance]

The zeolite membrane composites produced in Example 1 were evaluated for their dehydration performance of the membrane in a water ($H_2O$)-methanol (MeOH) mixed liquid, in a water ($H_2O$)-ethanol (EtOH) mixed liquid, and in a water ($H_2O$)-isopropyl alcohol (IPA) mixed liquid, by pervaporation (PV) and vapor permeation (VP). For the pervaporation, the zeolite membrane composite M1 was used, and for the vapor permeation, the zeolite membrane composites M1, M2, M3, and M4 were used.

(Pervaporation)

Figure 7:
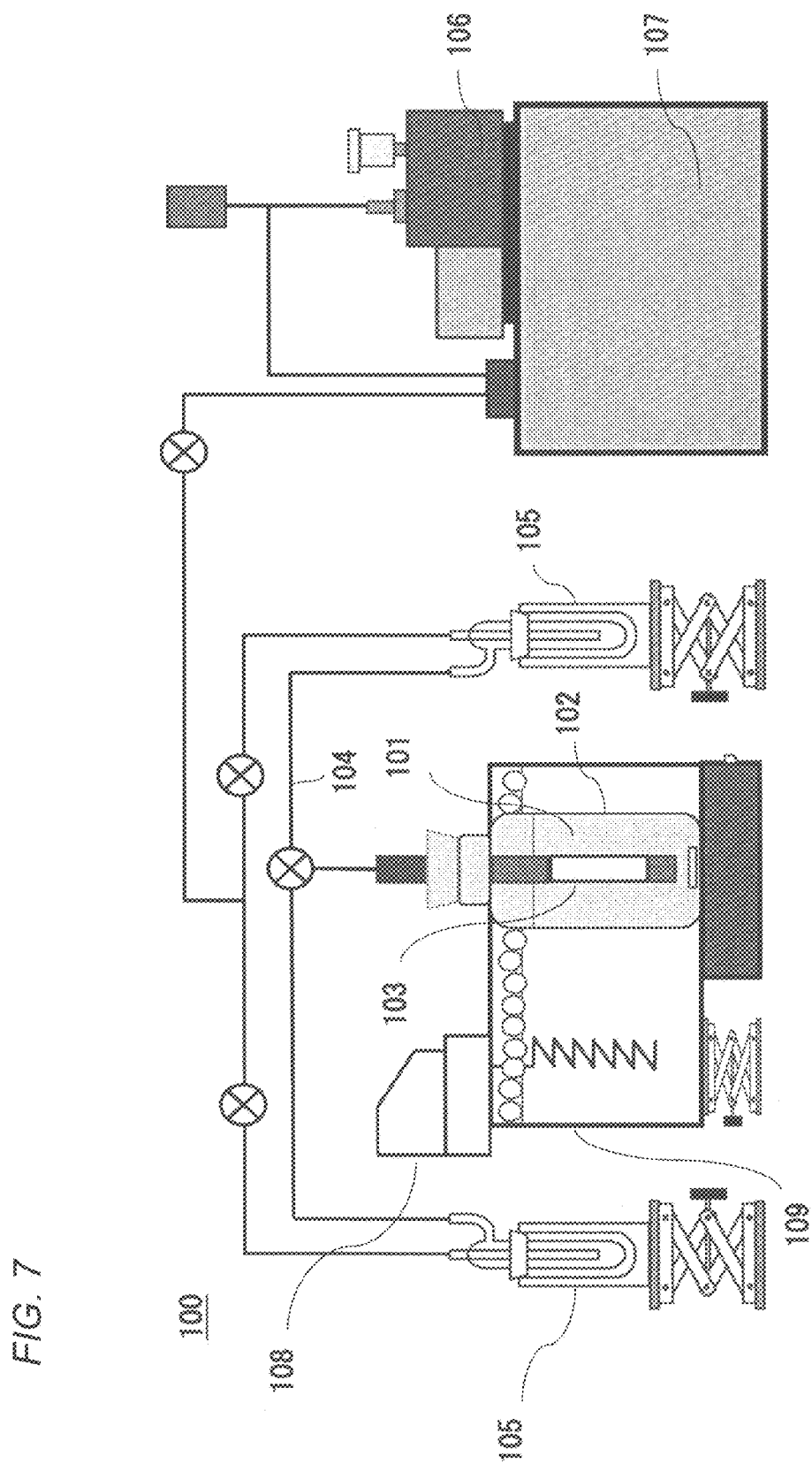
FIG. 7 A schematic diagram of an apparatus for evaluating dehydration performance by pervaporation.

An apparatus used for the pervaporation test will be described below with reference to FIG. 7 which schematically illustrates an example thereof. An apparatus 100 includes: a chamber 102 containing a water-alcohol mixed liquid 101; a zeolite membrane composite 103 of a cylindrical shape, which is immersed vertically to the liquid surface of the mixed liquid 101 in the chamber 102; a pipe 104 to which a vapor is introduced from the hollow space of the zeolite membrane composite 103; two cold traps 105 for cooling the vapor introduced from the pipe 104; and a vacuum pump 106 for reducing the pressure in the hollow space of the zeolite membrane composite 103, via the cold traps 105 and the pipe 104. The vacuum pump 106 is provided with a vacuum pump cold trap 107, in order to prevent the entry of the water-alcohol mixed liquid 101. The chamber 102 is placed in a thermostatic bath 109, and the thermostatic bath 109 is equipped with a heater 108 for controlling the temperature of the water-alcohol mixed liquid 101.

The pervaporation test was performed as follows. First, the temperature of the water-alcohol mixed liquid 101 was raised to a predetermined temperature by the heater 108. Thereafter, the pressure in the hollow space of the zeolite membrane composite 103 was reduced with the vacuum pump 106, to allow the vapor to permeate from outside to inside the zeolite membrane composite 103. The permeated vapor was collected at one of the cold traps 105.

The permeation flux (kg/m²h) which represents the amount collected per unit time and unit area was determined from the change in mass. Also, the amount of the collected liquid and the water concentration therein (water concentration on the permeation side, mass %) were measured, and a permeance of water (mol/(m²·s·Pa)) was calculated. In addition, a water selectivity α represented by ratio of the permeance of water to a permeance of alcohol was determined. A greater value of α means a higher water selectivity. The composition of water and alcohol in the collected material was measured using a gas chromatograph (GC3200, available from GL Sciences Inc.).

The dehydration performance at 50° C., 60° C. or 75° C. was evaluated in a water-methanol mixed liquid, in a water-ethanol mixed liquid, and in a water-isopropyl alcohol mixed liquid, by the pervaporation test. The pressure outside the zeolite membrane composite 103 (the supply side pressure) was set to 0.1 MPa (ordinary pressure), and the pressure in the hollow space of the zeolite membrane composite 103 (the permeation side pressure) was reduced to below 1 kPa by the vacuum pump 106. The effective membrane area was set to 22.60 cm². The results are shown in Table 2.

Table 2 also shows: the test results of an LTA-type zeolite membrane disclosed in Patent Literature 1 (JPH7-185275) as Reference Example 1; the test results of CHA-type zeolite membranes disclosed in Patent Literature 3 (WO2015/159986) as Reference Examples 2, 5 and 8; the test results of an LTA-type zeolite membrane disclosed in Patent Literature 4 (JP2003-210950) as Reference Example 3; the test results of a T-type zeolite membrane disclosed in Patent Literature 5 (JP2000-042387) as Reference Example 4; the test results of an LTA-type zeolite membrane and a T-type zeolite membrane disclosed in Non-Patent Literature 2 (Kita et al., J. Membr. Sci., 2004, 236, 17-27) as Reference Examples 6 and 7, respectively; the test results of an MOR-type zeolite membrane disclosed in Patent Literature 6 (JP2010-247150) as Reference Example 9; and the test results of an MFI-type zeolite membrane disclosed in Patent Literature 7 (JP2012-50930) as Reference Example 10. In these Reference Examples, an alumina tube was used as the support for the membrane.

trap 207 to prevent the entry of the water-alcohol mixed liquid 201. The chamber 202 is placed in a mantle heater stirrer 214.

The vapor permeation test was performed as follows. The water-alcohol mixed liquid 201 was poured into the chamber 202, and heated with the mantle heater stirrer 214 set at a predetermined temperature, to boil the water-alcohol mixed liquid 201 to generate the water-alcohol mixed vapor 210. The zeolite membrane composite 203 was set at a predetermined position, and allowed to stand, with a vapor generating region kept warm with aluminum foil, until the membrane surface temperature reached a predetermined temperature. Thereafter, the pressure inside the zeolite membrane composite 203 was reduced with the vacuum pump 206, to allow the water-alcohol mixed vapor 210 to permeate from outside to inside the zeolite membrane composite 203, and the permeated vapor was collected at one of the cold traps 205.

The permeation flux (kg/m²h), the water concentration (mass %), the permeance of water (mol/(m²·s·Pa)), and the water selectivity α were determined in the same manner as in the pervaporation test.

The dehydration performance at 105° C. in a water-methanol mixed liquid of each of the zeolite membrane

TABLE 2

| Zeolite membrane | Type of membrane | First atomic ratio (Si/Al) | Mixed liquid (mass ratio) | Separation temperature (° C.) | Permeation flux (kg/m²h) | Water concentration on permeation side (mass %) | Water permeance coefficient (mol/m²·s·Pa) | Water selectivity α (—) |
|---|---|---|---|---|---|---|---|---|
| M1 | LTA | 1.54 | H₂O/MeOH (10/90) | 60 | 0.16 | 99.91 | $1.61 \cdot 10^{-7}$ | 10,000 |
| Ref Ex. 1 | LTA | 1.0 | H₂O/MeOH (10/90) | 50 | 0.57 | | | 2,100 |
| M1 | LTA | 1.54 | H₂O/MeOH (30/70) | 60 | 0.49 | 99.90 | $1.80 \cdot 10^{-7}$ | 2,394 |
| Ref Ex. 2 | CHA | 3.0 | H₂O/MeOH (30/70) | 50 | 1.0 | 94.28 | $2.3 \cdot 10^{-6}$ | 37 |
| M1 | LTA | 1.54 | H₂O/EtOH (10/90) | 75 | 0.74 | >99.99 | $5.66 \cdot 10^{-7}$ | >100,000 |
| Ref Ex. 3 | LTA | 1.0 | H₂O/EtOH (10/90) | 75 | 2.15 | 99.91 | | 10,000 |
| Ref Ex. 4 | T | 3-4 | H₂O/EtOH (10/90) | 75 | 1.25 | 99.60 | | 2,200 |
| Ref Ex. 5 | CHA | 3.2 | H₂O/EtOH (5/95) | 60 | 0.72 | 99.81 | $2.1 \cdot 10^{-6}$ | 10,200 |
| M1 | LTA | 1.54 | H₂O/IPA (10/90) | 75 | 1.20 | >99.99 | $7.18 \cdot 10^{-7}$ | >100,000 |
| Ref Ex. 6 | LTA | 1.0 | H₂O/IPA (10/90) | 75 | 1.76 | | | 10,000 |
| Ref Ex. 7 | T | 3-4 | H₂O/IPA (10/90) | 75 | 1.7 | 99.97 | | 10,000 |
| Ref Ex. 8 | CHA | 3.2 | H₂O/IPA (10/90) | 70 | 4.1 | 99.91 | $3.3 \cdot 10^{-6}$ | 9,700 |
| Ref Ex. 9 | MOR | 5-10 | H₂O/IPA (10/90) | 75 | 3.7 | | | 3,400 |
| Ref Ex. 10 | MFI | 3-∞ | H₂O/IPA (10/90) | 75 | 1.5 | | | 1,500 |

(Vapor Permeation)

Figure 8:
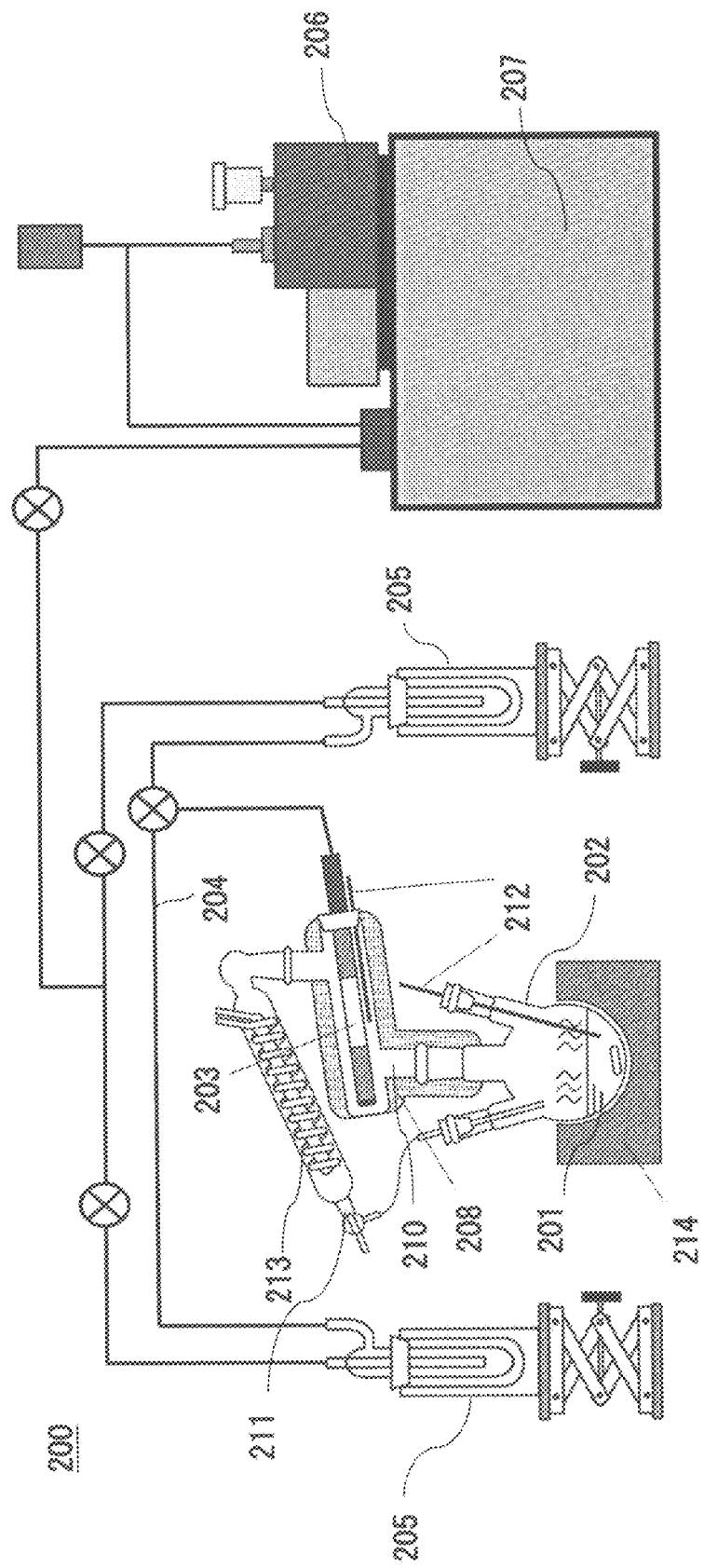
FIG. 8 A schematic diagram of an apparatus for evaluating dehydration performance by vapor permeation.

An apparatus used for the vapor permeation test will be described below with reference to FIG. 8 which schematically illustrates an example thereof. An apparatus 200 includes: a chamber 202 containing a water-alcohol mixed liquid 201; a zeolite membrane composite 203 of a cylindrical shape, which is arranged to come in contact with a water-alcohol mixed vapor 210 generated from the water-alcohol mixed liquid 201 in the chamber 202; a heater 208 for heating the zeolite membrane composite 203; thermocouples 212 each attached to the chamber 202 and the heater 208; a pipe 204 to which a vapor is introduced from the hollow space of the zeolite membrane composite 203; two cold traps 205 for cooling the vapor introduced from the pipe 204; a vacuum pump 206 for reducing the pressure in the hollow space of the zeolite membrane composite 203, via the cold traps 205 and the pipe 204; and a condenser 213 for cooling a non-permeated vapor having not permeated through the zeolite membrane composite 203, to return a solution after cooling 211 back into the chamber 202. The vacuum pump 206 is provided with a vacuum pump cold composites M1, M2, M3, and M4 was evaluated by the vapor permeation test. With respect to M1, its dehydration performance up to 200° C. was further evaluated. Here, 800 ml of the water-alcohol mixed liquid 201 was placed in the chamber 202, and the effective membrane area was set to 22.60 cm².

The water-methanol mixed liquid used for the evaluation of the dehydration performance at 105° C. was prepared in a ratio of H₂O/MeOH=24/76 (mass ratio), so that the vapor composition became H₂O/MeOH=10/90 (mass ratio). The temperature of the mantle heater stirrer 214 was set at 130° C.

Evaluations at 125° C., 150° C., 175° C., and 200° C. were also performed in the same manner as the evaluation at 105° C., except that the temperature of the mantle heater stirrer 214 was set as appropriate. The evaluation results are shown in Table 3.

A commercially available LTA-type zeolite membrane composite ml (Lot. 1267-007, available from Mitsui Engineering & Shipbuilding Co., Ltd.) was used to perform similar tests to the above. The results are also shown in Table 3. The test results of an LTA-type zeolite membrane disclosed in Patent Literature 4 (JP2003-210950) are also shown as Reference Example 11. In these zeolite membrane composites, an alumina tube was used as the support for the membrane.

and subjected to the pervaporation test at 60° C. for 174 hours. With the effective membrane area, and the supply side and permeation side pressures set similarly to those in the dehydration performance evaluation test, the total perme-

TABLE 3

| Zeolite membrane | Type of membrane | First atomic ratio (Si/Al) | Mixed vapor (mass ratio) | Separation temperature (° C.) | Permeation flux (kg/m²h) | Water concentration on permeation side (mass %) | Water permeance coefficient (mol/m² · s · Pa) | Water selectivity α (—) |
|---|---|---|---|---|---|---|---|---|
| M1 | LTA | 1.54 | H₂O/MeOH (10/90) | 105 | 0.97 | >99.99 | 1.05 · 10⁻⁶ | >100,000 |
| M2 | LTA | 1.52 | H₂O/MeOH (10/90) | 105 | 0.84 | >99.99 | 8.50 · 10⁻⁷ | >100,000 |
| M3 | LTA | 1.49 | H₂O/MeOH (10/90) | 105 | 0.92 | >99.99 | 1.01 · 10⁻⁶ | >100,000 |
| M4 | LTA | 1.45 | H₂O/MeOH (10/90) | 105 | 1.30 | 99.96 | 1.44 · 10⁻⁶ | 22,491 |
| M1 | LTA | 1.54 | H₂O/MeOH (10/90) | 125 | 0.97 | 99.94 | 1.05 · 10⁻⁶ | 17,659 |
| M1 | LTA | 1.54 | H₂O/MeOH (10/90) | 150 | 0.93 | 99.86 | 1.03 · 10⁻⁶ | 7,789 |
| M1 | LTA | 1.54 | H₂O/MeOH (10/90) | 175 | 0.91 | 99.82 | 1.02 · 10⁻⁶ | 6,152 |
| M1 | LTA | 1.54 | H₂O/MeOH (10/90) | 200 | 0.90 | 99.69 | 9.79 · 10⁻⁷ | 3,453 |
| Ref. Ex. 11 | LTA | 1.0 | H₂O/MeOH (10/90) | 105 | 4.14 | 99.65 | | 2,500 |
| m1 | LTA | 1.0 | H₂O/MeOH (10/90) | 125 | 1.23 | 98.21 | 1.10 · 10⁻⁶ | 465 |
| m1 | LTA | 1.0 | H₂O/MeOH (10/90) | 150 | 1.21 | 96.82 | 1.08 · 10⁻⁶ | 268 |
| m1 | LTA | 1.0 | H₂O/MeOH (10/90) | 175 | 1.36 | 93.68 | 1.09 · 10⁻⁶ | 119 |
| m1 | LTA | 1.0 | H₂O/MeOH (10/90) | 200 | 1.43 | 90.96 | 1.16 · 10⁻⁶ | 80 |

Tables 2 and 3 show that the zeolite membrane composites M1, M2, M3, and M4 produced in Examples 1 and 2 all exhibited high water selectivity in the water-methanol mixed liquid, the water-ethanol mixed liquid, and the water-isopropyl alcohol mixed liquid. The water selectivity was high even at high temperatures of 105° C. to 200° C. On the other hand, with the conventional zeolite membrane composite shown as Reference Example, it was difficult to achieve high water selectivity especially in the water-methanol mixed liquid. The foregoing results show that the zeolite membrane composites M1, M2, M3, and M4 have excellent separation performance, even as compared to the conventional zeolite membrane composite shown as Reference Example.
(Hydrothermal Stability)

The zeolite membrane composites M2, M5, M6, and M7 and a commercially available LTA-type zeolite membrane composite ml (Lot. 1267-007, available from Mitsui Engineering & Shipbuilding Co., Ltd.) were evaluated for their hydrothermal stability, using the pervaporation apparatus.

Figure 9:
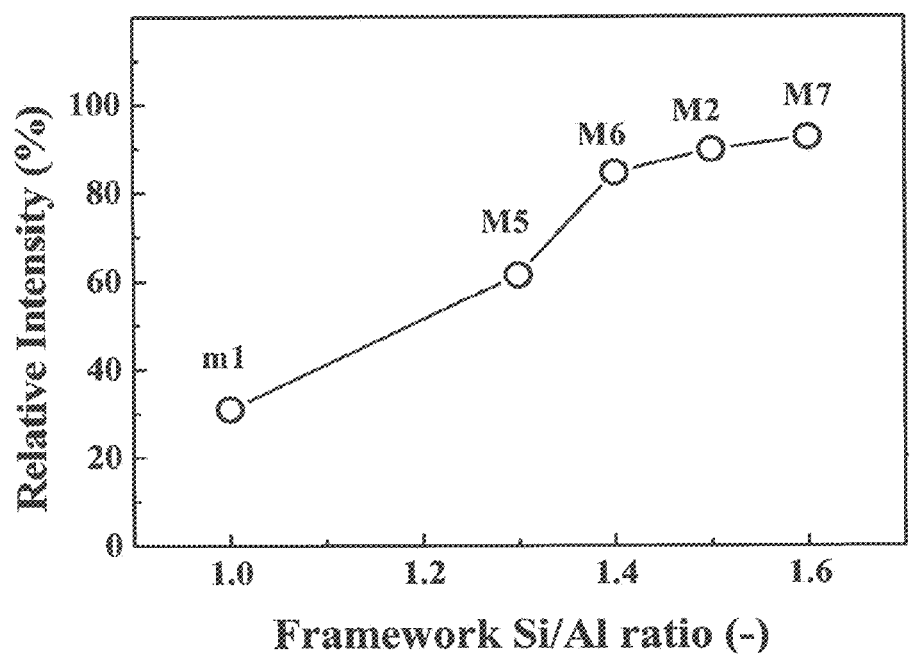
FIG. 9 A graph showing a relationship between the first atomic ratio: Si/Al and the hydrothermal stability of membranes.

The zeolite membrane composite was placed in a water-methanol mixed liquid (water concentration: 50 mass %) and subjected to the pervaporation test at 60° C. for 2 days. Changes in the structure before and after the test were observed by an X-ray diffractometry. The peak intensities at 2θ=7.18°, 10.16°, 12.44° and 16.10° were measured before and after the test, and the sum of the peak intensities after the test was determined as a relative intensity (%) to the sum of peak intensities before the test which was taken as 100%. The results are shown in FIG. 9. The horizontal axis is the atomic ratio: Si/Al of the zeolite membrane (Framework Si/Al ratio), and the vertical axis is the relative intensity (Relative Intensity).

The higher the first atomic ratio: Si/Al of the zeolite membrane was, the more likely the structure was maintained after the test, which resulted in an increased hydrothermal stability. Especially when the Si/Al was around 1.4 to 1.5, the increase was remarkable.
(Long-Term Hydrothermal Stability)

The zeolite membrane composite M1 produced in Example 1 was evaluated for its long-term hydrothermal stability, using the pervaporation apparatus.

The zeolite membrane composite was placed in a water-methanol mixed liquid (water concentration: 50 mass %), ation flux (kg/m²h), the water concentration (mass %), the permeances of water and methanol (mol/m²·s·Pa), and the water selectivity were determined.

Figure 10A:
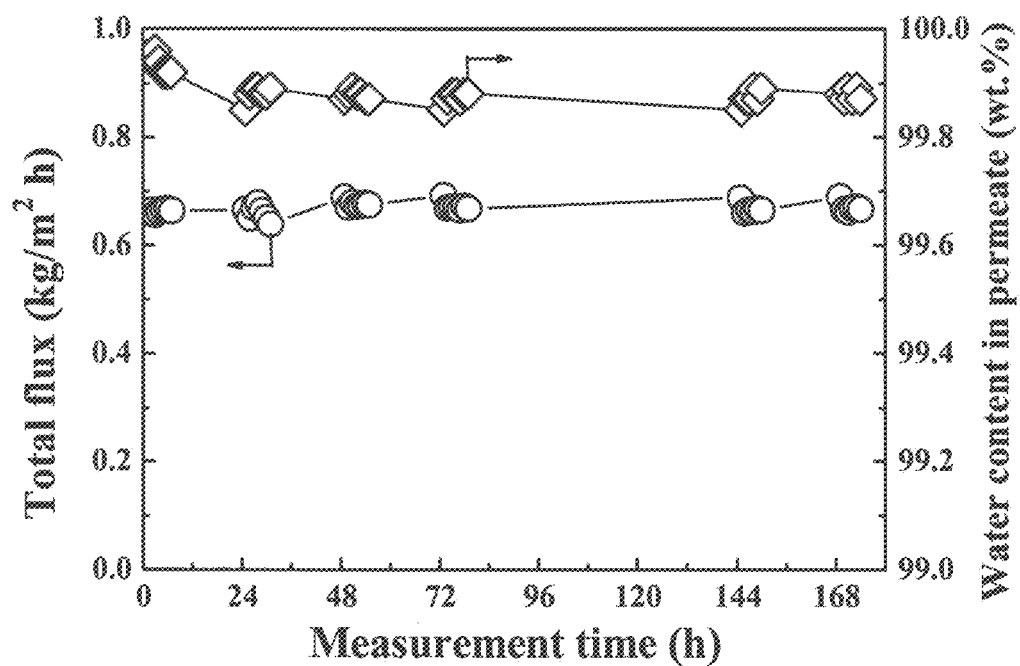
FIG. 10A A graph showing changes overtime in permeation flux and in water concentration in permeated fluid.
Figure 10B:
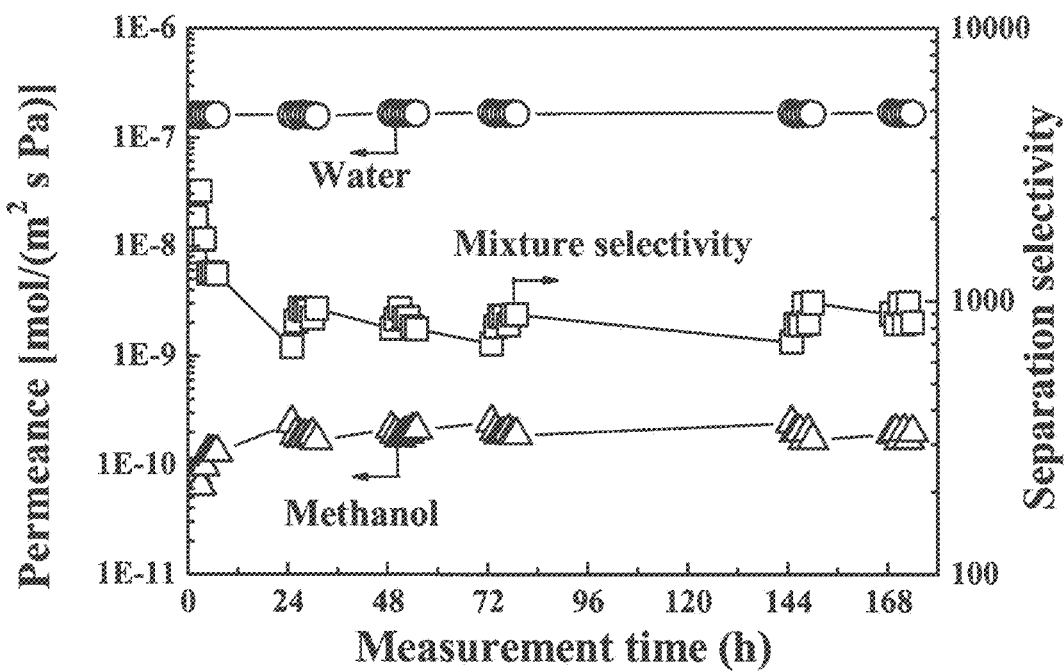
FIG. 10B A graph showing changes overtime in permeances of water and methanol and in water selectivity.

The results are shown in FIGS. 10A and 10B. In FIG. 10A, the horizontal axis is the duration of measurement (Measurement time), and the vertical axes are the total permeation flux (Total flux) and the water concentration in the permeated fluid (Water content in permeate). In FIG. 10B, the horizontal axis is the duration of measurement (Measurement time), and the vertical axes are the permeances of water and methanol (Permeance) and the water selectivity (Separation selectivity).

FIGS. 10A and 10B show that the water permeability and the water selectivity were both maintained at a certain level for 174 hours. The results show that the zeolite membrane composite M1 has excellent hydrothermal stability over a long period of time.

There is a report that says that in a zeolite membrane in which the first atomic ratio: Si/Al is low, the zeolite layer may collapse under the condition of high water concentration (Li et al., J. Membr. Sci., 2007, 297, 10-15). This explains the reason for the low relative intensity of the commercially available LTA-type zeolite membrane composite ml in the above hydrothermal stability test.

On the other hand, in a zeolite membrane composite in which the Si/Al ratio is high, the stable structure is considered to be maintained over a long period of time even in a high-temperature solution with high water concentration.

Next, the zeolite membrane composite M3 produced in Example 1 was evaluated for its long-term hydrothermal stability, using the vapor permeation apparatus.

The zeolite membrane composite was placed in a water-methanol mixed liquid (water concentration: 50 mass %), and subjected to the vapor permeation test at 150° C. for 174 hours. With the effective membrane area, and the supply side and permeation side pressures set similarly to those in the dehydration performance evaluation test, the total permeation flux (kg/m²h), the water concentration (mass %), the permeances of water and methanol (mol/m²·s·Pa), and the water selectivity were determined.

Figure 11A:
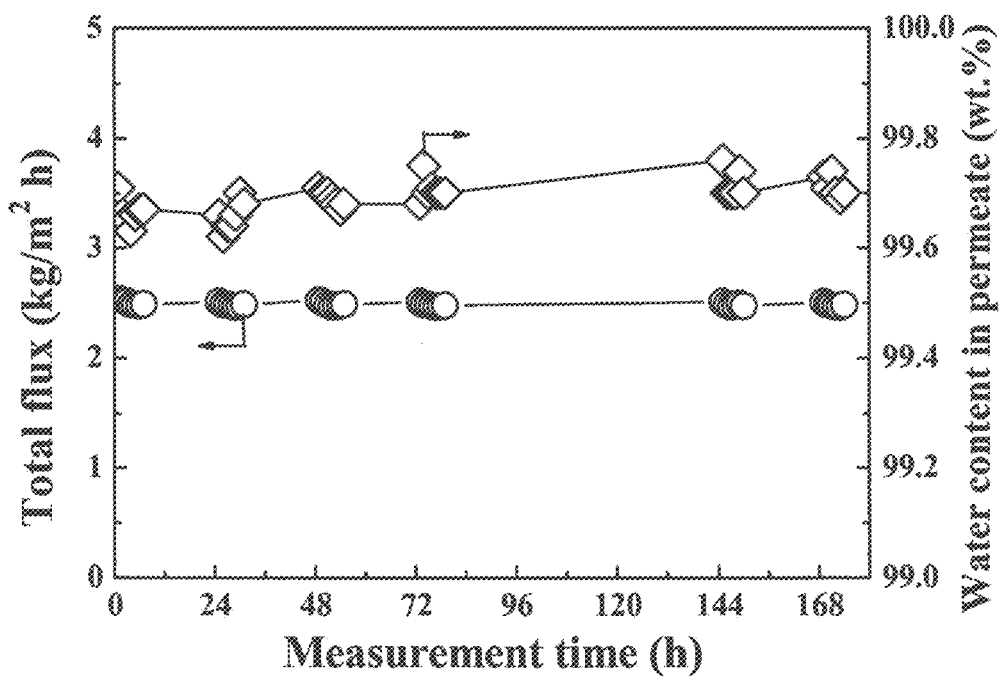
FIG. 11A A graph showing changes overtime in permeation flux and in water concentration in permeated fluid, under a high temperature condition.
Figure 11B:
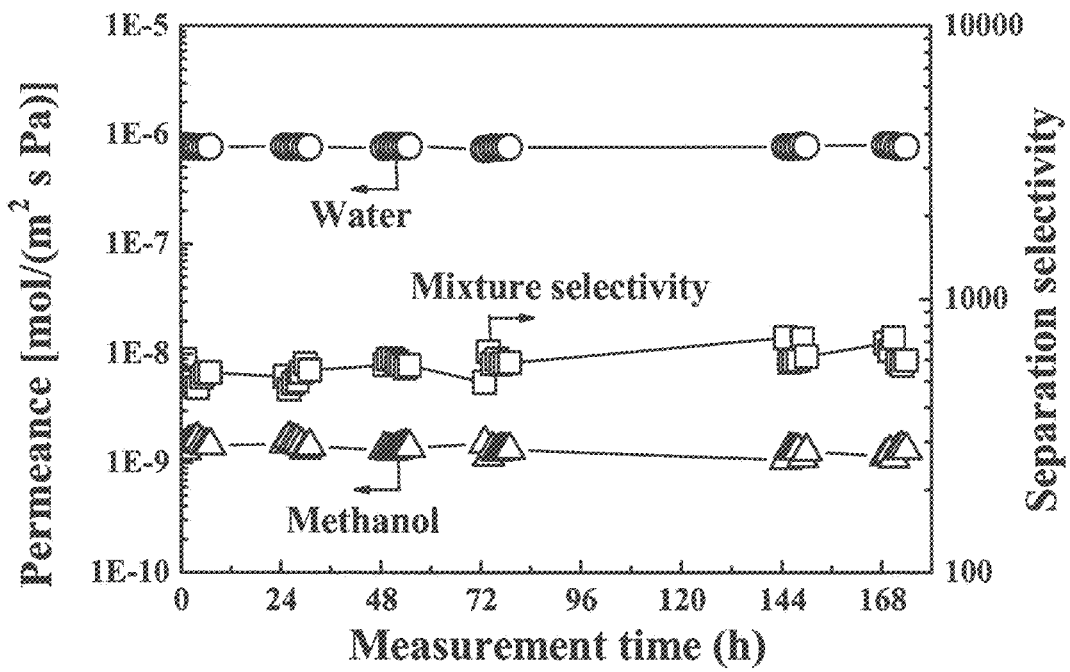
FIG. 11B A graph showing changes overtime in permeances of water and methanol and in water selectivity, under a high temperature condition.

The results are shown in FIGS. 11A and 11B. In FIG. 11A, the horizontal axis is the duration of measurement (Measurement time), and the vertical axes are the total permeation flux (Total flux) and the water concentration in the permeated fluid (Water content in permeate). In FIG. 11B, the horizontal axis is the duration of measurement (Measurement time), and the vertical axes are the permeances of water and methanol (Permeance) and the water selectivity (Separation selectivity).

FIGS. 11A and 11B show that the water permeability and the water selectivity were both maintained at a certain level for 174 hours. The results show that the zeolite membrane composite M3 has excellent hydrothermal stability and thermal stability over a long period of time, even for a high-temperature vapor mixture with high water concentration. This indicates that in a zeolite membrane composite having a high Si/Al ratio, the stable structure can be maintained over a long period of time even in a high-temperature vapor mixture with high water concentration.

INDUSTRIAL APPLICABILITY

A zeolite membrane composite having an LTA-type crystal structure according to the present invention, in which the ratio: Si/Al of silicon element (Si) to aluminum element (Al) in the membrane is greater than 1, is excellent not only in water selectivity and water permeability but also in thermal stability, acid resistance, and hydrothermal stability. It is therefore applicable to various fluid separation methods and separation purification systems.

REFERENCE SIGNS LIST 10, 10A: zeolite membrane composite
11: first surface
12: second surface
13, 13A: porous support
14, 14A: zeolite
100: pervaporation apparatus
101, 201: water-alcohol mixed liquid
102, 202: chamber
103, 203: zeolite membrane composite
104, 204: pipe
105, 205: cold trap
106, 206: vacuum pump
107, 207: vacuum pump cold trap
108, 208: heater
109: thermostatic bath
200: vapor permeation apparatus
210: water-alcohol mixed vapor
211: solution after cooling
212: thermocouple
213: condenser
214: mantle heater stirrer

The invention claimed is:

1. A zeolite membrane composite, comprising:
a porous support; and
a zeolite membrane formed on a surface of the porous support, wherein
the zeolite membrane has an LTA-type crystal structure,
the zeolite membrane has a first atomic ratio: Si/Al of silicon element (Si) to aluminum element (Al) of 1.29 or greater and 1.60 or less,
the porous support has a first surface and a second surface, and has pores allowing the first surface and the second surface to communicate with each other, and the zeolite membrane is formed on at least one of the first surface and the second surface, and
a water selectivity represented by a ratio of the permeance of water to the permeance of methanol of 600 or greater, when placed in an aqueous methanol solution at 60° C. having a methanol concentration of 50 mass %, with a supply side pressure set at 0.1 MPa and a permeation side pressure set at 1 kPa.

2. The zeolite membrane composite according to claim 1, wherein the first atomic ratio: Si/Al is 1.45 or greater.

3. The zeolite membrane composite according to claim 1, wherein the first atomic ratio: Si/Al is 1.49 or greater and 1.54 or less.

4. The zeolite membrane composite according to claim 1, wherein the zeolite membrane has a thickness of 20 μm or less.

5. The zeolite membrane composite according to claim 1, wherein a material of the porous support is at least one selected from the group consisting of mullite, silica, alumina, and stainless steel.

6. The zeolite membrane composite according to claim 1, exhibiting
a total permeation flux of 0.5 kg/m$^2$·h or more and 1.0 kg/m$^2$·h or less,
a permeance of water of $1.10^{-7}$ mol/m$^2$·s·Pa or more and $5·10^{-7}$ mol/m$^2$·s·Pa or less, and
a permeance of methanol of $1·10^{-10}$ mol/m$^2$·s·Pa or more and $5·10^{-10}$ mol/m$^2$·s·Pa or less, and
when placed in an aqueous methanol solution at 60° C. having a methanol concentration of 50 mass %, with a supply side pressure set at 0.1 MPa and a permeation side pressure set at 1 kPa.

* * * * *